(12) United States Patent
Dymetman et al.

(10) Patent No.: US 9,722,957 B2
(45) Date of Patent: Aug. 1, 2017

(54) METHOD AND SYSTEM FOR ASSISTING CONTACT CENTER AGENTS IN COMPOSING ELECTRONIC MAIL REPLIES

(71) Applicant: Conduent Business Services, LLC, Dallas, TX (US)

(72) Inventors: Marc Dymetman, Grenoble (FR); Jean-Michel Renders, Quaix-en-Chartreuse (FR); Sriram Venkatapathy, Grenoble (FR); Spandana Gella, Telangana (IN)

(73) Assignee: CONDUENT BUSINESS SERVICES, LLC, Dallas, TX (US)

(*) Notice: Subject to any disclaimer, the term of this patent is extended or adjusted under 35 U.S.C. 154(b) by 156 days.

(21) Appl. No.: 14/702,850

(22) Filed: May 4, 2015

(65) Prior Publication Data

US 2016/0330144 A1    Nov. 10, 2016

(51) Int. Cl.
*G06F 17/30* (2006.01)
*H04L 12/58* (2006.01)
*G06F 17/27* (2006.01)

(52) U.S. Cl.
CPC .............. *H04L 51/02* (2013.01); *G06F 17/27* (2013.01); *G06F 17/30038* (2013.01)

(58) Field of Classification Search
CPC .............. G06F 17/27; G06F 17/30011; G06F 17/30029; G06F 17/30864; G06F 17/30867; G06F 17/30038; G06N 99/005; G06Q 10/06316; G06Q 10/10; G06Q 20/10; G06Q 30/0269; G10L 13/033; H04L 51/02; H04L 51/20
See application file for complete search history.

(56) References Cited

U.S. PATENT DOCUMENTS

2006/0004654 A1* 1/2006 Kornegay .............. G06Q 20/10
                                                            705/39
2006/0197973 A1    9/2006 Castellani et al.
(Continued)

OTHER PUBLICATIONS

Blei, et al., "Latent Dirichlet Allocation," J. Machine Learning Research, vol. 3, pp. 993-1022 (2003).
(Continued)

*Primary Examiner* — Le H Luu
(74) *Attorney, Agent, or Firm* — Fay Sharpe LLP (57) ABSTRACT

A system and method are disclosed which enable more effective email response authoring by contact center agents, for example, by automatically suggesting prototypical (entire) email responses to the human agent and interactive suggestion of next sentence candidates during the writing process. In one method, a customer inquiry is received and a latent topic prediction is generated, based on a word-based representation of the customer inquiry. A latent topic prediction is generated for an entire agent's reply to the customer inquiry as a function of the latent topic prediction generated for the customer inquiry. A further latent topic prediction is generated for a next sentence of the agent's reply as a function of a topic prediction for the next sentence which is generated with a prediction model that has been trained on annotated sentences of agent replies. Information is output to assist the agent, based on the topic predictions.

20 Claims, 7 Drawing Sheets

(56) References Cited

U.S. PATENT DOCUMENTS

| | | | |
|---|---|---|---|
| 2007/0094384 A1* | 4/2007 | Matsumura | G06Q 10/10 709/224 |
| 2008/0091408 A1 | 4/2008 | Roulland et al. | |
| 2010/0229080 A1 | 9/2010 | Roulland et al. | |
| 2010/0235343 A1* | 9/2010 | Cao | G06F 17/30864 707/710 |
| 2011/0099133 A1* | 4/2011 | Chang | G06N 99/005 706/12 |
| 2011/0283190 A1* | 11/2011 | Poltorak | G10L 13/033 715/716 |
| 2012/0245925 A1* | 9/2012 | Guha | G06F 17/27 704/9 |
| 2012/0323828 A1* | 12/2012 | Sontag | G06F 17/30011 706/12 |
| 2013/0124449 A1* | 5/2013 | Pinckney | G06F 17/30867 706/52 |
| 2013/0275429 A1* | 10/2013 | York | G06F 17/30029 707/737 |
| 2015/0242789 A1* | 8/2015 | Cannato | G06Q 10/06316 705/7.26 |
| 2015/0312200 A1* | 10/2015 | Brav | H04L 51/02 709/206 |
| 2016/0203523 A1* | 7/2016 | Spasojevic | G06Q 30/0269 705/14.66 |

OTHER PUBLICATIONS

Chaudhuri, et al., "Bhattacharyya distance," Encyclopedia of Mathematics, pp. 1-3 (2011), downloaded at http://www.encyclopediaofmath.org/index.php/Bhattacharyya_distance, on May 6, 2015.

Chen, et al., "Two-Stage Stochastic Natural Language Generation for Email Synthesis by Modeling Sender Style and Topic Structure," Proc. 8th Int'l Natural Language Generation Conference, pp. 99-102 (Jun. 19-21, 2014).

Cheng, et al., "Soft Labeling for Multi-Pass Document Review," DESI V Workshop at 14th Int'l Conf. on AI and Law (ICAIL 2013), pp. 99-102 (2013).

Cohen, et al., "Learning to classify email into speech acts," EMNLP, pp. 309-316 (2004).

Derpanis, "The Bhattacharyya Measure," pp. 1-3 (2008), downloaded at http://www.cs.yorku.ca/~kosta/CompVis_Notes/bhattacharyya.pdf on Jan. 26, 2015.

Gupta, et al., "Emotion detection in email customer care," Computational Intelligence, vol. 29, vol. 3, pp. 489-505 (2013).

Hofmann, "Unsupervised learning by probabilistic latent semantic analysis," Machine Learning, vol. 42 (1/2), pp. 177-196 (2001).

Lamontagne, et al., "Textual reuse for email response," Adv. in Case-Based Reasoning, pp. 242-256 (2004).

Lee, "Algorithms for nonnegative matrix factorization," Adv. in Neural Information Processing Systems, vol. 13, pp. 556-562 (2001).

McCallum, "Mallet: A machine learning for language toolkit," pp. 1-2 (2002), downloaded at http://people.cs.umass.edu/~mccallum/mallet/ on Jan. 26, 2015.

Muresan, et al., "Combining linguistic and machine learning techniques for email summarization," Proc. 2001 workshop on Computational Natural Language Learning—vol. 7, Article 19, pp. 1-8, ACL (2001).

Oya, et al. "Extractive summarization and dialogue act modeling on email threads: An integrated probabilistic approach," SIGDIAL 2014, pp. 133-140 (2014).

Rambow, et al., "Summarizing email threads," Proc. HLT-NAACL 2004: Short Papers, pp. 105-108, ACL (2004).

Rubino, et al., "Topic Models for Translation Quality Estimation for Gisting Purposes," MT Summit XIV, pp. 295-302 (Sep. 2013).

Scheffer, "Email answering assistance by semi-supervised text classification," Intelligent Data Analysis, vol. 8, No. 5, pp. 481-493 (2004).

Searle, "A classification of illocutionary acts," Language in Society, vol. 5, No. 1, pp. 1-23 (1976).

Weng, et al., "Using text classification and multiple concepts to answer e-mails," Expert Systems with Applications, vol. 26, No. 4, pp. 529-543 (2004).

Xiong, et al., "A Topic-Based Coherence Model for Statistical Machine Translation," Proc. 27th AAAI Conf. on Artificial Intelligence, pp. 977-983 (2014).

Zhai, et al., "Discovering latent structure in task-oriented dialogues," ACL (1), pp. 36-46 (2014).

* cited by examiner

METHOD AND SYSTEM FOR ASSISTING CONTACT CENTER AGENTS IN COMPOSING ELECTRONIC MAIL REPLIES

BACKGROUND

The exemplary embodiment relates to natural language processing and finds particular application in connection with a system and method for assisting an agent to compose a reply to an electronic mail message.

With the advent of on-line support systems, agents are often given the task of replying to email queries. In the customer care case, agents frequently have to reply to similar queries from different customers. These similar queries often solicit replies that are also similar by sharing similar topic structures and vocabulary.

In customer care centers, in order to help the agents send replies to similar queries, the agents often have access to a repository of standard responses. When the agent is preparing a tailored response to a query from the customer, the agent searches among the appropriate standard responses, makes appropriate modifications to the text, fills in information and then sends the reply. This process is both inflexible and time consuming, especially in cases where the customer query is slightly different from one of the expected queries.

Much of the recent work addressing email text analytics has focused on classification and summarization. Email classification has proven useful for spam detection and filtering high-priority messages. Summarization has been useful in processing emails and posts from email groups and discussion forums (Muresan, et al., "Combining linguistic and machine learning techniques for email summarization," Proc. 2001 Workshop on Computational Natural Language Learning, Vol. 7, Article 19, ACL (2001); and Rambow, et al., "Summarizing email threads," Proc. HLT-NAACL 2004: Short Papers, pp. 105-108, ACL (2004)). Semi-supervised classification techniques have been proposed for question answering in the context of email threads (Scheffer, "Email answering assistance by semi-supervised text classification," Intelligent Data Analysis, 8(5):481-493 (2004)). Classification and summarization techniques have been suggested that are based on "speech acts" or "dialog acts" such as proposing a meeting, requesting information (Searle, "A classification of illocutionary acts," Language in Society, 5(01):1-23 (1976)). Studies involving summarizing of email threads or classification of emails involve dialog-act based analysis have been made (Oya, et al. "Extractive summarization and dialogue act modeling on email threads: An integrated probabilistic approach," SIGDIAL (2014); Cohen, et al., "Learning to classify email into speech acts," EMNLP, pp. 309-316 (2004)).

In the domain of customer care, studies have been made for identification of emotional emails related to customer dissatisfaction/frustration and learning possible patterns/phrases for textual re-use in email responses (Gupta, et al., "Emotion detection in email customer care," Computational Intelligence, 29(3):489-505 (2013); Lamontagne, et al., "Textual reuse for email response," Adv. in Case-Based Reasoning, pp. 242-256 (2004)). Methods have been proposed for suggesting templates for email responses in the customer care domain (Weng, et al., "Using text classification and multiple concepts to answer e-mails," Expert Systems with Applications, 26(4):529-543 (2004)).

The problem of discovering the latent structure of topics in spoken and written conversations has been addressed using HMM-based methods handling dialog state transitions and topic content simultaneously (Zhai, et al., "Discovering latent structure in task-oriented dialogues," ACL (1), pp. 36-46 (2014). However, the method is suited to short alternating conversational utterances, rather than large single email responses typical in customer care field. Further, the method does not predict which topics will likely be employed in a forthcoming agent's response.

There remains a need for a more flexible system and method for proposing replies to an agent for responding to a customer query.

BRIEF DESCRIPTION

In accordance with one aspect of the exemplary embodiment, a method for assisting an agent to respond to a customer inquiry includes receiving a customer inquiry. A first latent topic prediction is generated for the customer inquiry based on a word-based representation of the customer inquiry. A second latent topic prediction is generated for an entire agent's reply to the customer inquiry as a function of the latent topic prediction generated for the customer inquiry. A third latent topic prediction is generated for a next sentence of the agent's reply as a function of a topic prediction for the next sentence generated with a prediction model trained on annotated sentences of agent replies. Information is output to assist the agent, based on the second and third topic predictions.

At least one of the generating of the first, second and third latent topic predictions and the outputting of information may be performed with a processor.

In accordance with another aspect of the exemplary embodiment, an assistance system includes memory which stores a set of latent topic prediction models. A customer electronic mail message topic prediction component generates a latent topic prediction for an input customer inquiry, in the form of a first electronic mail message. The latent topic prediction is based on a word-based representation of the customer inquiry and a first of the latent prediction models which has been trained on at least one of annotated customer inquiries and annotated agent replies. An agent electronic mail message topic prediction component generates a latent topic prediction for an agent's reply to the customer inquiry, in the form of a second electronic mail message, as a function of the latent topic prediction generated for the customer inquiry. A sentence topic prediction component generates a latent topic prediction for a next sentence of the agent's reply based on at least one previous sentence of the agent's reply and a second of the prediction models which has been trained on annotated sentences of agent replies. A suggestion component outputs information to assist the agent, based on the latent topic prediction for the agent's reply and the latent topic prediction for a next sentence of the agent's reply. A processor in communication with the memory implements the components.

In accordance with another aspect of the exemplary embodiment, a topic prediction method includes learning a plurality of topic prediction models including a first topic prediction model and a second topic prediction model. The first topic prediction model is learned with at least one of annotated customer inquiries and annotated agent replies. The second topic prediction model is learned on annotated sentences of agent replies. The annotations are generated with a generative topic model which predicts latent topics based on a word-based representation of text. A first latent topic prediction is generated for a customer's inquiry with the first topic prediction model. A second latent topic prediction is generated for an agent's reply to the customer inquiry as a function of the latent topic prediction generated for the customer inquiry. A third latent topic prediction is generated for a next sentence of the agent's reply as a function of a prior sentence of the agent's reply and the second prediction model.

At least one of the generating of the first, second and third latent topic predictions may be performed with a processor.

DETAILED DESCRIPTION

The exemplary embodiment relates to a system and method for assisting an agent, such as a customer care agent, in composing electronic mail replies, such as email, text message (SMS) or online chat replies, responsive to a customer enquiry. In the exemplary system and method, agents can benefit from suggestions with respect to the topic structure as well as to the content, in an interactive manner, to help in the effective composition of the textual reply.

Figure 1:
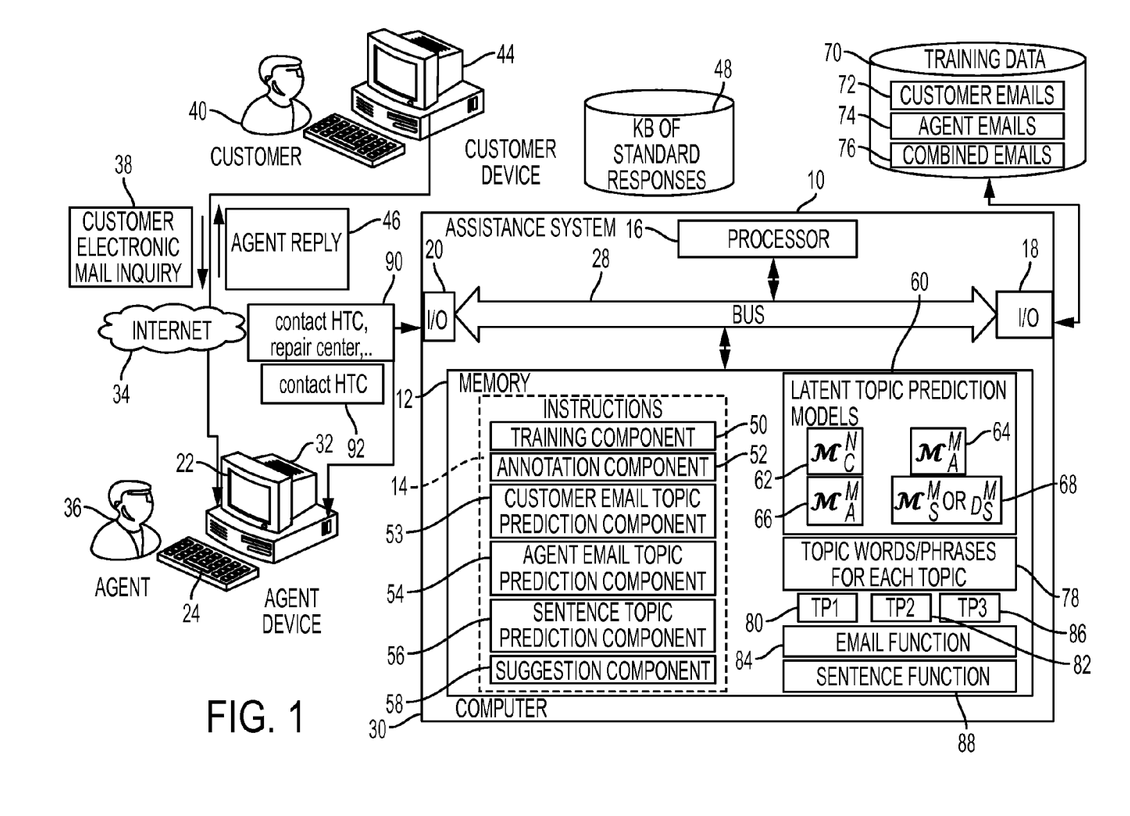
FIG. 1 is a functional block diagram of a system for proposing email replies in accordance with one aspect of the exemplary embodiment.

With reference to FIG. 1, a functional block diagram of a computer-implemented system 10 for assisting an agent to compose an electronic mail reply is shown. The illustrated assistance system 10 includes memory 12 which stores instructions 14 for performing the method illustrated in FIG. 2 and a processor 16 in communication with the memory for executing the instructions. The system 10 also includes one or more input/output (I/O) devices, such as a network interface 18 and a user input/output interface 20. The I/O interface 20 may communicate with one or more of a display device 22, for displaying information to users (agents), and a user input device 24, such as a keyboard, keypad, or touch or writable screen, and/or a cursor control device, such as mouse, trackball, or the like, for inputting text and for communicating user input information and command selections to the processor device 16. The various hardware components 12, 16, 18, 20 of the system 10 may be all connected by a data/control bus 28.

The computer system 10 may include one or more computing devices 30, such as a PC, such as a desktop, a laptop, palmtop computer, portable digital assistant (PDA), server computer, cellular telephone, tablet computer, pager, combination thereof, or other computing device capable of executing instructions for performing the exemplary method.

In the illustrated embodiment, the display device 22 and user input device 24 are components of an agent's computing device 32, which is communicatively linked to the I/O interface 20 via a wired or wireless link 34, such as a local area network or a wide area network, such as the Internet. In other embodiments, the system 10 may be hosted by the agent's device. The agent 36 receives an inquiry 38 from a customer 40, via a wired or wireless link 34, such as the Internet. The inquiry 38 is in the form of an electronic mail message generated with an electronic mail application on the customer's computing device 44. The inquiry is received by an electronic mail application hosted by the agent's device, such as Microsoft Outlook™, or other email application. The inquiry is displayed on the agent's display device 22. The agent views the displayed inquiry, e.g., contained in the body of an email, and drafts a reply 46, with the assistance of the exemplary system 10. The agent may have access to a collection 48 of standard agent replies for responding to customer inquiries of the type typically encountered. These may be stored in a knowledge base, indexed by topics or by a topic distribution over a set of latent topics, or by keywords, or the like. An exemplary knowledge base is structured according to problem descriptions (describing problems the customer may face with a device or service) and solution descriptions (which an agent may use to respond to the customer's inquiry). See, for example, U.S. Pub. Nos. 2006/0197973, 2008/0091408, and 20100229080, incorporated herein by reference, for a description of such a knowledge base.

The inquiry and reply may be part of an email or SMS message trail forming a discussion thread relating to a problem that the customer is facing with a device or service. The discussion thread may include one or more electronic mail messages from the customer 40 to the agent and one or more electronic mail messages from the agent to the customer. The assistance system 10 receives the customer's inquiry 38, e.g., from the agent device 32, or from the customer device 44, or an intermediate server computer, and stores it in system memory 12 during processing.

The exemplary system and method provide topic and/or content suggestions to the agent in a non-intrusive manner. This means that the agent can ignore suggestions that the agent considers to be irrelevant during the composition of the message.

In the context of customer care, an email thread may be started by a customer reporting a problem or seeking information, followed by an agent's response suggesting one or more solutions for fixing the problem or asking for more details to enable the agent to identify a solution to the reported problem. These threads continue until the problem is solved or the customer is satisfied with the agent's response. Usually, customer emails are in free form while the agent's replies have a moderately systematic structure. There are at least two emails in an email thread, i.e., at least one customer email and at least one agent email, although there are frequently more than two emails in the thread, such as three, four or more emails, each composed of one or more sentences. In general, agent replies often include two or more sentences.

The exemplary system focuses on two topic prediction tasks:

Task T1: email topic prediction for the entire email response 46 that is yet to be composed. This is helpful for automatically suggesting an appropriate standard response 48 to the agent. Assuming that such a document is available, this can help the agent in planning the response. Task T1 entails predicting the likely overall topic(s) of the entire agent's reply, based on knowledge of the customer's email.

Task T2: sentence topic prediction for the next sentence in the reply 46. When an agent is writing an email reply, the sentence topic prediction includes predicting the likely topics of the next sentence, based on the initial query and the additional knowledge of the previous sentence(s). This is useful in interactively presenting the topics for the next sentence (and the corresponding representative sentence or phrases), which the agent can choose or ignore while composing the reply.

Topic prediction of the entire email response as well as of the next sentence can be made with reasonably high accuracy, making these predictions useful in the setting of interactive composition. Often, however, a fully automatic composition is not possible given the inherent non-deterministic nature in the problem. Accordingly, an agent is able to adapt the proposals made by the system to the particular inquiry being addressed.

The exemplary system includes a training component 50, an annotation component 52, a customer electronic mail message (e.g., email) topic prediction component 53, an agent electronic mail message (e.g., email) topic prediction component 54, a sentence topic prediction component 56, and a suggestion component 58.

The training component trains a set 60 of two or more latent topic prediction models on annotated training data 70. In one embodiment, two or more of the latent topic prediction models 62, 64, 66, 68 are trained on a training set 70 which includes a collection 72 of prior customer emails analogous to email 38, and a collection 74 of prior agent emails 58, analogous to email 46, which have been collected from the same domain. For example, if the domain relates to mobile phones, the inquiries 72 and replies 74 used in training may all relate to mobile phones. In some embodiments, the training data includes a set 76 of combined agent+customer emails. Each collection in the training set 70 may be split into a train set, for model training, and a test set, for evaluating the performance of the trained model, although the test set may not be necessary in practical implementations.

In some embodiments, a latent topic prediction model 62 is trained on annotated customer emails and can be used to make a latent topic prediction (predict a latent topic or topic distribution) for a received customer email 38. In some embodiments, a latent topic prediction model 64 is trained solely on annotated agent emails. Topic prediction model 64 may be used to make a latent topic prediction for the entire content of the agent's reply 46. In some embodiments, a latent topic prediction model 66 is trained on combined annotated customer and agent emails. The topic prediction model 66 can be used to make latent topic predictions for one or both of the customer's email inquiry 38 and the agent's email reply 46. In some embodiments, a latent topic prediction model 68 is trained solely on annotated sentences from agent emails. Topic prediction model 68 may be used to make a latent topic prediction for the next sentence of the agent's reply 46.

Since it is often costly to acquire training data 70 which has been manually annotated at the level of topics, at least some of the annotations (topic labels) for the agent and customer emails may be automatically generated by the annotation component 52. In the exemplary embodiment, the automatic annotation also produces, for each latent topic in a set of latent topics with which the training data is annotated, an associated distribution over words 78. The words are derived from the samples in the respective collection 72, 74, or 76 of training samples (e.g., after excluding stop words and other less discriminative words). The topics are generated by a generative model that automatically discovers a set of topics, each topic having probabilities of generating a respective set of words, allowing documents to be represented by a distribution over topics based on the words they contain. An exemplary generative model useful herein is Latent Dirichlet Allocation (LDA). Other methods for generating topics which may be used herein include Non-negative Matrix Factorization (NMF) and Probabilistic Latent Semantic Analysis (PLSA. See, for example, Lee, "Algorithms for nonnegative matrix factorization," Advances in Neural Information Processing Systems, 13:556-562, 2001; Hofmann, "Unsupervised learning by probabilistic latent semantic analysis," Machine Learning, 42(1/2):177-196, 2001, for a discussion of these techniques.

Given a new customer email inquiry 38, the customer email topic prediction component 53 generates a first latent topic prediction (TP1) 80, e.g., predicts a topic distribution or a predominant topic for the customer's email inquiry 38, using the topic prediction model 62 and/or 66, based on a representation of the customer email inquiry 38. The word-based representation can be, for example, a bag-of-words representation, in the form of a vector, each element of the vector representing a respective word. The vector can be a binary vector, with a 0 for each word that is absent and a 1 for each word that is present, or can be a more complex representation which represents the number of occurrences of each word. In some embodiments a term frequency-inverse document frequency (tf-idf) representation is used. The vector representation can be very sparse, since only a few words from a large set of words used in the training examples is likely to be present. Stop words and less discriminative words can be omitted from the set of words.

The email topic prediction component 54 generates a second latent topic prediction (TP2) 82, e.g., predicts a topic distribution or a predominant topic for an entire email reply 46 (task T1) based on the predicted topic(s) 80 for the customer email, e.g., using a learned mapping function (or "predictor") 84. The sentence topic prediction component 56 generates a third latent topic prediction (TP3) 86, e.g., identifies a topic distribution (or a predominant topic) for a next sentence of the email 46 (task T2). This prediction can be made with a second mapping function 88, which is based on a representation (e.g., a bag-of-words representation, as for the first mapping function) of a current sentence of the agent's email and a fourth latent topic prediction output by the topic prediction model 68. Once the agent has completed the first sentence of the reply, the sentence topic prediction component 56 repeats the process for the next sentence, and so forth.

The suggestion component 58 outputs information 90 based on the predicted latent topic(s) 82 for the agent's email (e.g., the set of words predominantly associated with the topic extracted during annotation), and/or information based thereon, such as one or more standard responses 48 labeled with that topic, to the agent 36 for review. The suggestion component 58 subsequently outputs information 92, e.g., presents the identified sentence topic(s) 86 (e.g., the set of words predominantly associated with the latent topic extracted during annotation), and/or information based thereon, such as a set of sentences from the standard responses 48 labeled with the latent topic(s), to the agent 36 for review.

The memory 12 may represent any type of non-transitory computer readable medium such as random access memory (RAM), read only memory (ROM), magnetic disk or tape, optical disk, flash memory, or holographic memory. In one embodiment, the memory 12 comprises a combination of random access memory and read only memory. In some embodiments, the processor 16 and memory 12 may be combined in a single chip. Memory 12 stores instructions for performing the exemplary method as well as the processed data.

The network interface 18 allows the computer to communicate with other devices via a computer network, such as a local area network (LAN) or wide area network (WAN), or the internet, and may comprise a modulator/demodulator (MODEM) a router, a cable, and and/or Ethernet port.

The digital processor device 16 can be variously embodied, such as by a single-core processor, a dual-core processor (or more generally by a multiple-core processor), a digital processor and cooperating math coprocessor, a digital controller, or the like. The digital processor 16, in addition to executing instructions 14 may also control the operation of the computer 30.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 1 is a high level functional block diagram of only a portion of the components which are incorporated into a computer system 10. Since the configuration and operation of programmable computers are well known, they will not be described further.

Figure 2:
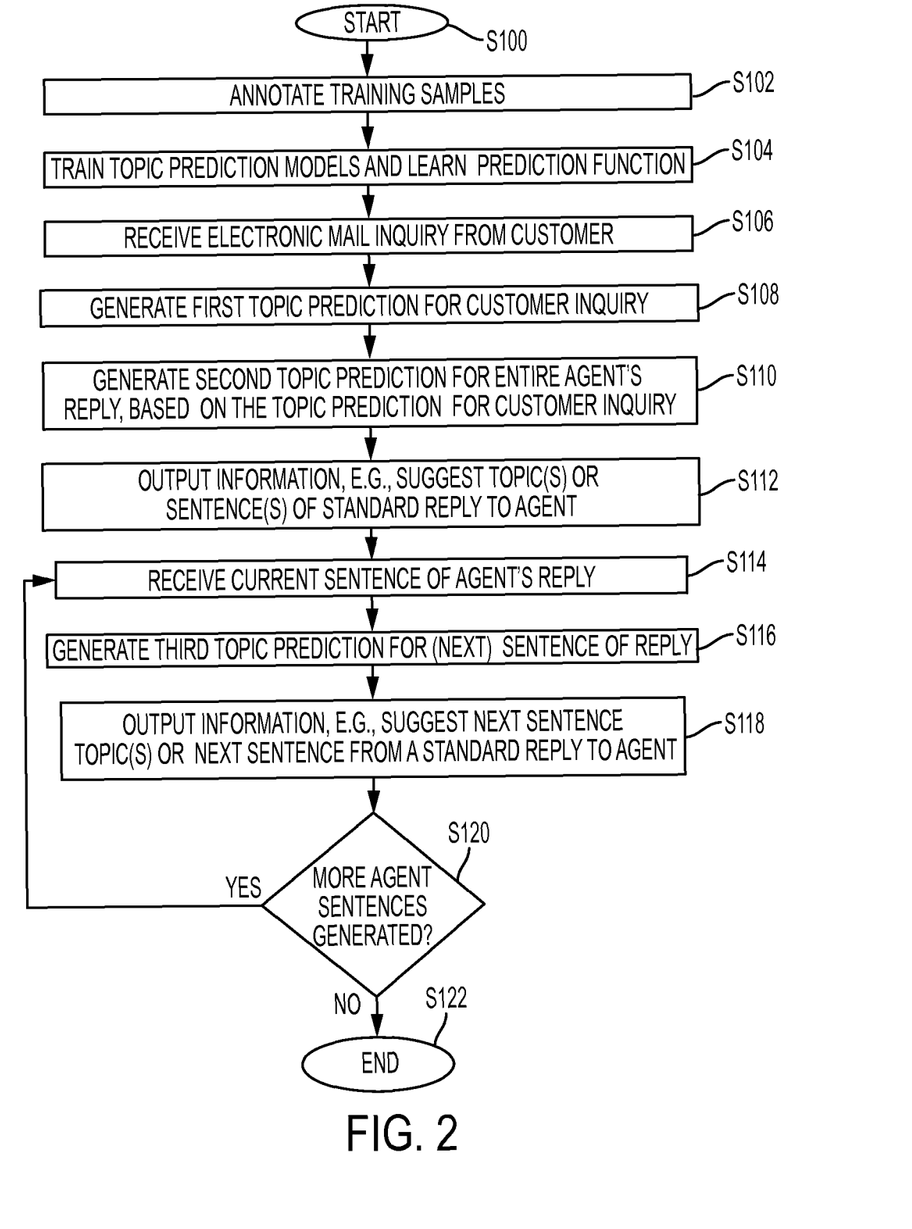
FIG. 2 is a flow chart illustrating a method for proposing email replies in accordance with another aspect of the exemplary embodiment.

FIG. 2 illustrates a method for assisting an agent in authoring an email reply. The method begins at S100.

At S102, training samples (generated from customer emails 72 and/or agent emails 74) are (automatically) annotated by latent topic, based on their content. Each latent topic is associated, in memory 12, with a set of words and/or phrases 78 extracted from the training samples, which are representative of the latent topic and which are discriminative for the latent topic.

At S104, latent topic prediction models (two or more of models 62, 64, 66, 68) are trained on the annotated training samples and stored in memory, such as memory 12. Mapping functions 84, 88 for generating a topic prediction for the agent's email and a next sentence, respectively, can also be learned.

At S106, an electronic mail enquiry 38, submitted by a customer, is received.

At S108, a first latent topic prediction 80, such as a topic distribution or a predominant topic is generated for the customer's email, by the email topic prediction component 53, using a customer topic prediction model 62 or 66 that is based, at least in part, on training samples that use customer inquiries.

At S110, a second latent topic prediction 82, such as a distribution or a predominant topic is predicted for an entire agent's reply 46, based on the customer email topic prediction at S108, by the email topic prediction component 54. A latent topic prediction may also be made for a first sentence of the reply 46, by the sentence topic prediction component 56, using the sentence topic prediction model 68.

At S112, information 90 based on the predicted topic distribution or predominant topic 82 is output. For example, the predicted topic distribution or predominant topic 82 for the agent's entire reply (e.g., the associated set 78 of discriminative keywords) may be sent to the agent and/or used by the suggestion component 58 to identify one or more standard responses 48 that relate to the predicted topic or topic distribution, which are then output by the system to be displayed on the agent's display device. Alternatively, only the first sentence of each the standard responses 48 is presented at this stage.

At S114, the agent's edits to a first (current) sentence of one of the standard responses 48 (or an entirely new sentence generated by the agent) is/are received by the system.

At S116, a third latent topic prediction 86, such as a topic distribution or a predominant topic for the next sentence of the agent's reply is predicted by the sentence topic prediction component 56 using the sentence topic prediction model 68 and predictor 88. The system is not limited to sentences of the standard responses 48 but may also draw from agent sentences in the training set.

At S118, information 92 based on the predicted topic distribution or predominant topic 86 is output. For example, the topic distribution or predominant topic 86 for the next sentence (e.g., the set of corresponding discriminative keywords 78) may be sent to the agent and/or used by the suggestion component 58 to identify one or more sentences from standard responses 48 that relate to the predicted latent topic or topic distribution, which are then output by the system to be displayed on the agent's display device.

If at S120, the agent generates another sentence, the method returns to S114. Otherwise, if a stopping point is reached, e.g., the agent emails the reply, the method ends (S122), or waits for the next customer inquiry email to be received at S106.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 30, (for example, an internal hard drive of RAM), or may be separate (for example, an external hard drive operatively connected with the computer 30), or may be separate and accessed via a digital data network such as a local area network (LAN) or the Internet (for example, as a redundant array of inexpensive of independent disks (RAID) or other network server storage that is indirectly accessed by the computer 30, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

The exemplary system and method thus develop and/or employ latent topic models 62, 64, 66, 68 that can help a person, such as a customer care agent 36, reply to an email inquiry 38. This is particularly useful for the customer care situation, where agents frequently have to reply to similar queries 38 from different customers 40. These similar queries solicit replies that are similar as well, sharing similar topic structures and vocabulary. Hence, providing suggestions to the agent with respect to the topic structure as well as to the content, in an interactive manner, can help in the effective composition of the email reply.

Extracting Latent Topics and Annotation of Training Samples

In one embodiment, the training emails are annotated manually. In another embodiment, an automated method for assigning topics is used.

In order to synthesize annotations for the training data 70 an unsupervised technique employing LDA, may be used (at S102) by the training component 50 for modeling the topic space of various views of the collection. LDA is described, for example, in David M Blei, et al., "Latent Dirichlet Allocation," J. Machine Learning Res., 3:993-1022 (2003). Prior to LDA annotation, text is extracted from each of the training emails and a count of the number of words may be stored for normalizing the results. Additionally, a predefined number of the latent topics may be selected, such as a least 2, or at least 5 or at least 10 latent topics, such as up to 1000, or up to 500, or up to 100 latent topics. The number can be different for each of the topic models. These latent topics are thus learned automatically by the system in an unsupervised manner from the training data, e.g., by matrix factorization. The latent topics are thus not manually selected, only the number of topics is selected. A new document can then be assigned a probability distribution over the set of latent topics and/or over the words associated with each of the latent topics.

Three methods for extracting latent topics in the set of conversations are contemplated. In the first method, the customer and agent emails 72, 74 are kept separate. A distinct topic prediction model 62, 64 is identified at S104 for each document collection. In this method, a "document" is a customer email in the first collection 72, and an agent email in the second collection 74. Let $\mathcal{M}_C^N$ and $\mathcal{M}_A^M$ denote the topic models 62, 64 trained on the customer emails (using N latent topics) and the agent emails (using M latent topics), respectively. Subscripts C (customer) and A (agent) denote the respective type of latent topic prediction model.

In the second method, customer and agent emails from the same discussion thread are concatenated and a unique, common set of latent topics is identified. The customer's inquiry and agent's reply are considered as a single document. In some embodiments, only the first inquiry from the customer and first reply from the agent is considered as a document. In this method, the documents in the collection 76 used for training are each a concatenation of the customer's email and the agent's reply. The resulting model 66 generated at S104 is denoted as $\mathcal{M}_{CA}^M$, where M is the number of latent topics in the model.

In the third method, instead of considering the entire email text as a document, each sentence of the email is considered as a separate document when building the latent topic model (S104). Let $\mathcal{M}_S^M$ denote the sentences topic model 68 that is built from the agent reply messages only, in order to specialize the sentence-level topic model on the agent's style and vocabulary.

The latent topic extraction process on the training sets provides both a latent topic distribution over the training documents and a word distribution for each topic. Once the models are trained, from these word distributions and the model priors, a topic distribution for each word of a given document can be inferred. The training document can be an entire email or a single sentence. By aggregating these individual distributions, a global topic distribution can be derived for the whole training document.

These ascribed LDA latent topic annotations of the documents in the training set 70 are then used for training the prediction models 62, 64, 66, 68. For example, the model 66 is learned on a representation (such as a bag-of-words representation, or an n-gram representation, where n is at least two (words)) of each document and the respective latent topic distribution for the document. The performance of the models can be evaluated using corresponding LDA annotations of a test set of training documents. Additionally the topic assignments are not only used as labels to be predicted, but can also be used as additional features to represent and summarize, at the semantic level, the content of the customer's query (for task T1) and the content of the previous agent sentences for task T2.

In the following, a pair of emails of the form customer-query/agent-reply is denoted $(C_i, A_i)$ and the application of a topic model $\mathcal{M}_t^n$ to $C_i$ (resp., $A_i$) is denoted $\tau_t^n(C_i)$ (resp., $\tau_t^n(A_i)$), where n is the number of topics (M or N) and t is the type of model: t∈(C,A,CA,S), as described above. The quantity $\tau_t^n$ is a probability distribution over the n topics. The dominant topic $D_t^n$ of a test sample is the topic with the highest probability in this distribution.

Influence of the Customer Query on the Word-Level Perplexity

While two different models 64, 66 are suggested for predicting latent topics for the agent's reply, the $\mathcal{M}_{CA}^M$ model 66 is likely to yield improved results (see examples below). The influence of knowing the context of the customer's query 38 on the content of the agent's email 46 can be evaluated by word perplexity. For example, the set of test agent emails in the training set is used for evaluation, and the perplexity of the language model based on $\mathcal{M}_A^M$ is compared with the one identified with $\mathcal{M}_{CA}^M$. The model $\mathcal{M}_A^M$ infers the probability distribution $\tau_S^M(A_i)$ over topics by exploiting only the agent emails from the training set, while the model $\mathcal{M}_{CA}^M$ infers a probability distribution $(\tau_{CA}^M(A_i))$ over topics by exploiting both the customer queries and the agent replies in the training set.

The perplexity scores are computed using the following formulas:

$$\text{Perplexity}(A \mid \mathcal{M}_A^M) = \exp\left(\frac{-\sum_{i=1}^{d} \log L(A_i)}{\sum_{i=1}^{d} N_{A_i}}\right) \quad (1)$$

-continued $$\text{Perplexity}(A \mid C, \mathcal{M}_{CA}^M) = \exp\left(\frac{-\sum_{i=1}^{d} \log \frac{L(C_i + A_i)}{L(C_i)}}{\sum_{i=1}^{d} N_{A_i}}\right)$$

In these equations, the test set is $((C_1, A_1), (C_2, A_2), \ldots, (C_d, A_d))$, with $A = (A_1, \ldots, A_d)$ and $C = (C_1, \ldots, C_d)$, where d is the number of agent emails in the test set and $N_{A_i}$ is the total number of words in $A_i$. The term $L(A_i)$ (resp. $L(C_i)$, $L(C_i + A_i)$) is the likelihood of the sequence of words in $A_i$ (resp., $C_i$, $C_i + A_i$), as given by the LDA model $\mathcal{M}_A^M$ (resp., $\mathcal{M}_{CA}^M$, $\mathcal{M}_{CA}^M$).

The perplexity scores of the two models on an example collection suggest that the model 66, which uses the customer's email as context has lower perplexity scores. This indicates that a generative LDA model 66 has the potential to use the context C to directly improve the prediction of the words in A. However, rather than directly trying to predict words (which is influenced by the design of the user interface, for instance in the form of semi-automatic word completion), the exemplary method focuses on the problem of predicting the most relevant topics in a given context. As latent topics can be more readily associated with standard responses (sentences, paragraphs or whole emails), predicting the most relevant topics assists in recommending the most adequate responses. Thus, the standard responses 48, and individual sentences of those standard responses, may be labeled with topics from the same set of M latent topics.

Predicting Relevant Latent Topics of the Agent's Response

1. Topic Prediction for the Overall Agent's Email (S110)

The Task T1 involves predicting the latent topic distribution $\hat{\tau}^M(A_i)$ of the agent's response using only the contextual information, i.e., the customer query $C_i$ and its latent topic distribution $\tau_{CA}^M(C_i)$. It is noted that while either the $\mathcal{M}_{CA}^M$ model or the $\mathcal{M}_C^N$ model can be used for this task, the $\mathcal{M}_{CA}^M$ model may be more reliable, for the reasons given above. The $\mathcal{M}_{CA}^M$ model can be used to compute synthetic semantic features $(\tau_{CA}^M(C_i))$ for the customer email and also to provide annotations for the latent topic prediction $(\tau_{CA}^M(A_i))$. The latent topic distribution predictor for the entire agent's email 46 can be expressed as a function of the words of the customers inquiry and the latent topic prediction identified for it from the latent topic model $\mathcal{M}_{CA}^M$ (or $\mathcal{M}_C^M$). The predictor can thus be expressed as:

$$\hat{\tau}^M(A_i) = f(\omega(C_i), \tau_{CA}^M(C_i)) \quad (2)$$

where $\omega(C_i)$ represents the representation, e.g., bag-of-words representation, of the customer inquiry. In another embodiment, $\tau_C^M(C_i)$ is used in place of $\tau_{CA}^M(C_i)$ in Eqn. 2.

Learning the mapping function 84 shown in Equation 2 (in S104) can be performed by structured output learning. For solving it, logistic regression can be used, extended to use soft labels rather than binary labels. See, for example, Cheng, et al., "Soft Labeling for Multi-Pass Document Review," DESI V Workshop at 14th Int'l Conf. on AI and Law (ICAIL 2013), 2013.

The objective function can be trained with soft labels (the annotations given by $\tau_{CA}^M(A_i)$). The Kullback-Leibler divergence between the predicted $\hat{\tau}_E^M(A_i)$ and the computed $\tau_{CA}^M(A_i)$ obtained with the annotation component can be used as the loss function. A Stochastic Gradient Descent algorithm, or other gradient descent algorithm, can be used to optimize this loss function and thereby identify the parameters of the function. As noted above, the latent topic labels can be used both for building the prediction models (from the training set) and optionally for assessing the quality of the predicted latent topic distribution on the test set.

In one embodiment, the predictor training stage includes annotating agent's replies from the training set with topics, using the annotation component 52, and learning a predictor 84 which predicts these topics, given the words of the customer's inquiry and the topics predicted for the it using the learned model $\mathcal{M}_{CA}^M$ (or $\mathcal{M}_C^M$). As an example, for each topic k in the set of topics, the predicted topic weight can be expressed as:

$$\hat{\tau}_k^M(A_i) = \frac{\exp(\theta_{1,k} \omega(C_i) + \theta_{2,k} \cdot \tau_{CA}^M(C_i))}{\sum_{k=1 \text{ to } M} \exp(\theta_{1,k} \omega(C_i) + \theta_{2,k} \cdot \tau_{CA}^M(C_i))}$$

The learning learns the parameters $\theta_{1,k}$ and $\theta_{2,k}$ for each value of k. The resulting probabilities $\hat{\tau}_k^M(A_i)$ predicted for the agent's reply can be normalized to sum to 1.

2. Latent Topic Prediction for Each Sentence of the Agent's Email

To solve the second task (Task T2), namely predicting the latent topic distribution 86 of the next sentence of an agent's response, the following can be used: the words of the customer query $C_i$, its latent topic distribution $\tau_{CA}^M(C_i)$, the words of the current sentence of the agent's response, and the latent topic distribution predicted for the current sentence $\tau_{CA}^M(A_{i,j})$. This involves making a kind of Markovian assumption for the agent-side content: it assumes that the current sentence and its latent topic distribution are sufficient to predict the topic(s) of the next sentence, given the customer query context. Denoting the $j^{th}$ sentence in the agent email $A_i$ by $A_{i,j}$, the sentence topic predictor 88 can take the form:

$$\hat{\tau}_S^M(A_{i,j+1}) = f(\omega(C_i), \tau_{CA}^M(C_i), \omega(A_{i,j}), \tau_S^M(A_{i,j}), j) \quad (3)$$

where j is the sentence position (index), $\omega(C_i)$ is the bag-of-words representation of the customer's email, and $\omega(A_{i,j})$ is the bag-of-words representation of the current sentence of the agent's email (or in some embodiments, more sentences, if they have already been generated). The topic predictor of Eqn. 3 thus predicts the latent topic distribution $\hat{\tau}_S^M(A_{i,j+1})$ for the next $(j+1^{th})$ sentence of the agent's email as a function of the word-based representation of the customer's email, the latent topic prediction for the customer's email (both previously computed for use in Eqn. 2) and also the word-based representation of the current sentence of the agent's email and the latent topic prediction for the agent's current sentence $A_{i,j}$. In another embodiment, $\tau_C^M(C_i)$ is used in place of $\tau_{CA}^M(C_i)$ in Eqn. 3.

As an example, a learned function for Eqn. 3 may be of the form, for k ranging over the set of topics:

$$\hat{\tau}_{S,k}^M(A_{i,j+1}) = \frac{\theta_{1,k} \cdot \omega(C_i) + \theta_{2,k} \cdot \tau_{CA}^M(C_i) + \theta_{3,k} \cdot \omega(A_{i,j}) + \theta_{4,k} \cdot \tau_S^M(A_{i,j}) + \theta_{5,k} j}{\sum_{k=1 \text{ to } M} \theta_{1,k} \cdot \omega(C_i) + \theta_{2,k} \cdot \tau_{CA}^M(C_i) + \theta_{3,k} \cdot \omega(A_{i,j}) + \theta_{4,k} \cdot \tau_S^M(A_{i,j}) + \theta_{5,k} j},$$

where the learning involves learning the parameters $\theta_{1,k}$, $\theta_{2,k}$, $\theta_{3,k}$, $\theta_{4,k}$, and $\theta_{5,k}$, for each value of k.

Figure 3:
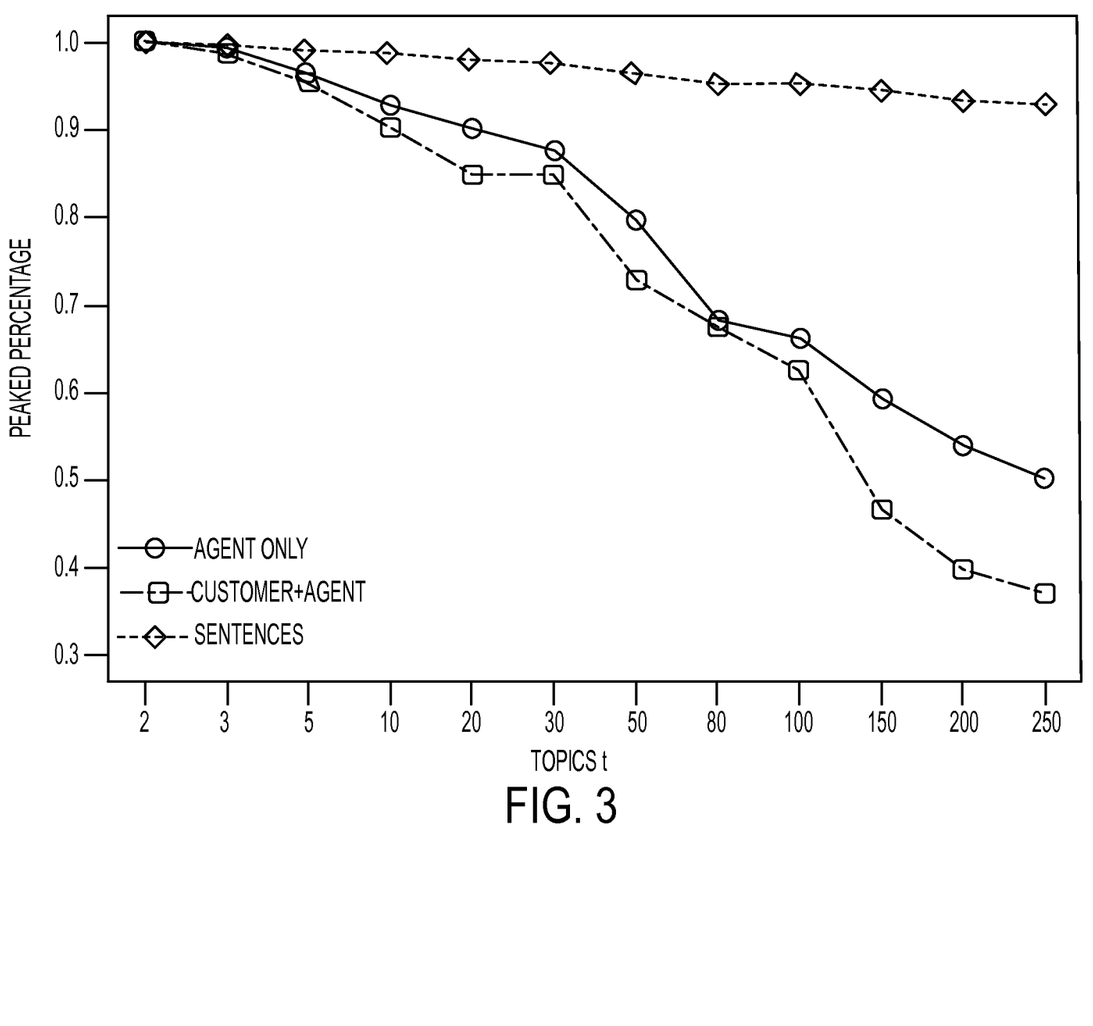
FIG. 3 is a plot which shows the percentage of sentences with a "peaked" latent topic distribution.

In practice, the latent topic distributions for sentences using the $\mathcal{M}_S^M$ model may be highly peaked at the "dominant" topic, as illustrated in FIG. 3. Accordingly, it may be advantageous to employ $D_S^M(A_{i,j})$, the dominant topic of the distribution $\tau_S^M(A_{i,j})$, instead of the whole distribution. Thus, instead of trying to predict the whole latent topic distribution of the next sentence, it is reasonable to predict only what will be its dominant topic. A variant of equation 3 which can be used as topic predictor 88 is therefore:

$$\hat{D}_S^M(A_{i,j+1}) = f(\omega(C_i), \tau_{CA}^M(C_i), \omega(A_{i,j}), D_S^M(A_{i,j}), j) \quad (4)$$

A standard multiclass logistic regression can be used for learning the function 88 shown in Eqn. 4. To be more precise, M different predictors 88 can be built, one for each possible dominant topic of the current sentence $D_S^M(A_{i,j})$. The predictors 88 can be learned on training pairs of a customer inquiry and an agent's response. The sentences of the agent's response can be numbered sequentially. The dominant topics are then identified for each of the agent's sentences using the annotation component, and then picking the topic with the highest score for each sentence. The predictor is trained to predict these dominant topic "labels," given the words of the corresponding customer's inquiry, the topic prediction $\tau_{CA}^M(C_i)$ (or $\tau_{CA}^M(C_i)$) output by the learned model $\mathcal{M}_{CA}^M$ (or $\mathcal{M}_C^M$), the words of the agent's prior sentence(s), and the dominant topic of the prior sentence of the agent's reply predicted by the model $\mathcal{M}_S^M$.

Then at test time, given the word-based representation of the customer email, its topic distribution, the word-based representation of the agents email (or at least the current sentence) and the dominant topic for the current sentence computed using the sentence-based model, the probability for one of the M topics is predicted, for each topic in turn. For j=0, i.e., for the first sentence, a family of simpler "degenerated" models, in the following form can be built:

$$\hat{D}_S^M(A_{i,1}) = f_D(\omega(C_i), \tau_{CA}^M(C_i)) \quad (5)$$

The system and method find application in a wide variety of contact centers, particularly in connection with customer care, in helping customer care agents to answer customer queries.

Advantages of the system and method may include time and cost reduction, as a significant part of the content generation process is initiated by the system, rather than by the agents; normalization towards "best practices" and better exploitation of knowledge bases; and a more complete automation of the process. The method is also complementary to other automated and semi-automated methods.

In contrast to other methods, the exemplary method exploits latent topics in the prediction models, generated in an unsupervised way, to capture semantically and synthetically the context of the customer query and, potentially the context of the current incomplete reply, to recommend the content to be expressed further. The exemplary synthetic annotations allow a link between the unsupervised topic models and annotated (i.e., supervised) content prediction.

Without intending to limit the scope of the exemplary embodiment, the following examples illustrate the application of the method to email exchanges in the telecommunications domain.

EXAMPLES

The exemplary methods were evaluated on a set of email exchanges in the Telecom domain in a customer care scenario. The dataset contains 54.7 k email threads collected during January 2013-May 2014. Usually, an email thread is started by a customer reporting a problem or seeking information, followed by an agent's response suggesting fixes or asking for more details to fix the reported problem. These threads continue until the problem is solved or the customer is satisfied with the agent's response.

Usually, customer emails are in free form while agent replies have a moderately systematic structure. On average, there are 8 emails in a thread. For the present study, only the first two emails in a thread, namely the original customer's query and the corresponding agent's reply, are considered. Also, the experiments are limited to emails which have at least 10 words for customer emails and at least 20 words for agent replies. This resulted in 48.3 k email threads out of which 80% were used for training and 20% for testing. TABLE 1 shows statistics of the dataset, where D=number of emails, Avg T=average number of tokens (words) in each email, Avg S=average number of sentences in email.

TABLE 1

Statistics of the Dataset

| | Train | | | Test | | |
|---|---|---|---|---|---|---|
| Type | D | Avg T | Avg S | D | Avg T | Avg S |
| Customer | 38650 | 68 | 2.6 | 9660 | 72 | 2.5 |
| Agent | 38650 | 221 | 8.1 | 9660 | 220 | 8.0 |

The following experiments were conducted:
1. Investigating the Influence of the Customer's Email on the Word-Level Perplexity of the Agent's Response This experiment was performed to validate and quantify the suggestion that the context given by the customer's query strongly conditions the agent's response.

TABLE 2 includes a sample of topics learned using the Sentences topic model ($\mathcal{M}_S^M$) on the example email collection. In the table, each topic is described with its top ranked words and phrases. These may be normalized to their lemma form (e.g., by using the infinitive form of verbs, singular form of nouns, etc., and/other normalizations, such as gender, depending on the natural language used in the emails)

TABLE 2

Representative Words and Phrases for Different Topics

| Latent Topic Label | Top words | Top phrases |
|---|---|---|
| Contact | support, technical, agent, team, write, contact | write team, support agent |
| Feedback | contact, enquiry, leave, close, enquiry | answer query, follow link, close enquiry, leave feedback |

TABLE 2-continued

Representative Words and Phrases for Different Topics

| Latent Topic Label | Top words | Top phrases |
|---|---|---|
| Reset | reset, factory, datum, setting, tap, back, erase, storage | master reset, perform factory reset |
| Repair | repair, device, book, send, center, email, back, warranty | repair center, book device repair |
| USB | usb, connect, cable, pc, charger, device | disk drive, default connection type, sync manager |
| Cache/App | clear, application, cache, app, datum, setting, delete | clear cache, manage application, cache partition |
| OS/Installation | update, software, system, setting, message, operating | system software update, installation error |
| SD Card | card, sd, account, save, tap, sim, import, people, application | sd card, google account, transfer contact, export sim card |
| Liability | return, charge, liable, un-repaired, device, quote, dispose | hold liable, free charge, choose pay, return handset |
| User Account | tap, account, enter, password, email, setting, step, set, require | username password, email account, secure credentials |
| Damage | repair, charge, brand, return, economic, unrepaired | brand charge, liquid-damaged accessory, return immediately |
| SIM/SD Card | card, data, sim, sd, phone, store, device, service, online | test sim card, data remove, insert sim card |
| Settings | tap, scroll, screen, setting, home, icon, notification | home screen, screen tap, notification bar |

As will be appreciated, the latent topic labels may be one of the associated words or a more generic label, such as Topic 1, 2, 3, etc.

In TABLE 3, an example of a query/reply email pair from the example email collection, as well as the corresponding Top-3 highest probability topics and their most representative words/phrases, both for the customer and the agent parts ($\mathcal{M}_{CA}^{M}$ model, with M=50).

FIG. 3 illustrates the percentage of sentences with a "peaked" topic distribution for the example email collection. The Sentences model ($\mathcal{M}_{S}^{M}$) gives rise to more peaked topic distributions as compared to the Agent only ($\mathcal{M}_{A}^{M}$), and Agent+Customer ($\mathcal{M}_{CA}^{M}$), models. A distribution is considered to be peaked when the probability of the dominant topic is at least 50% and at least twice that of the second most probable topic. Over the test set, more than 90% of

TABLE 3

Three Dominant Latent Topics for Customer and Agent Inferred using Email Text

| Email Text | Topic 1 | Topic 2 | Topic 3 |
|---|---|---|---|
| Customer Query: My mobile x fell out of my pocket and the screen cracked completely, I was wondering whether I am eligible for repair as it is still under the 24 month warranty? | screen crack, hardware operation, smash screen, display, htc, lcd | month ago, phone month, buy htc, year ago, phone warranty, contract, contact | phone work, month ago, time, problem, htc, issue, week, day, back |
| Agent Response: Thank you for contacting HTC regarding your HTC One X. My name is John and I am a Technical Support Agent for the HTC Email Team. I'm sorry to hear that you are experiencing difficulties with your device. I understand that the screen is broken. Unfortunately this is not covered by warranty, so if you wish to have it repaired, you will have to pay a quote. The quotation will be made by the repair center, and it is based on an examination of the handset that is done when it arrives in the repair center. This is why we are unable to provide you with the amount it would cost to have the display replaced. I hope that I have given you enough information to solve your query. If this is not the case, please do not hesitate to contact us again. If this answer has solved your query, and you have no further questions, you can close this ticket by clicking on the link shown below. On closing the ticket, you will receive an invitation to participate in our Customer Satisfaction Survey. This will only take 1 minute of your time. I wish you a pleasant day. | contact htc, write team, support agent, htc regard, technical support, contact htc regard | repair center, vary depend exchange rate, physical damage, minor liquid, cover warranty | leave feedback, close ticket, contact quickly, receive feedback | sentences exhibit a peaked distribution when considering the $\tau_S^M(A_i)$ topic distribution. This provides a rationale for the use of the single, most dominant topic instead of the whole distribution when solving the task T2.

2. Predicting the Topics in the Agent's Response Given the Customer's Query

Figure 4:
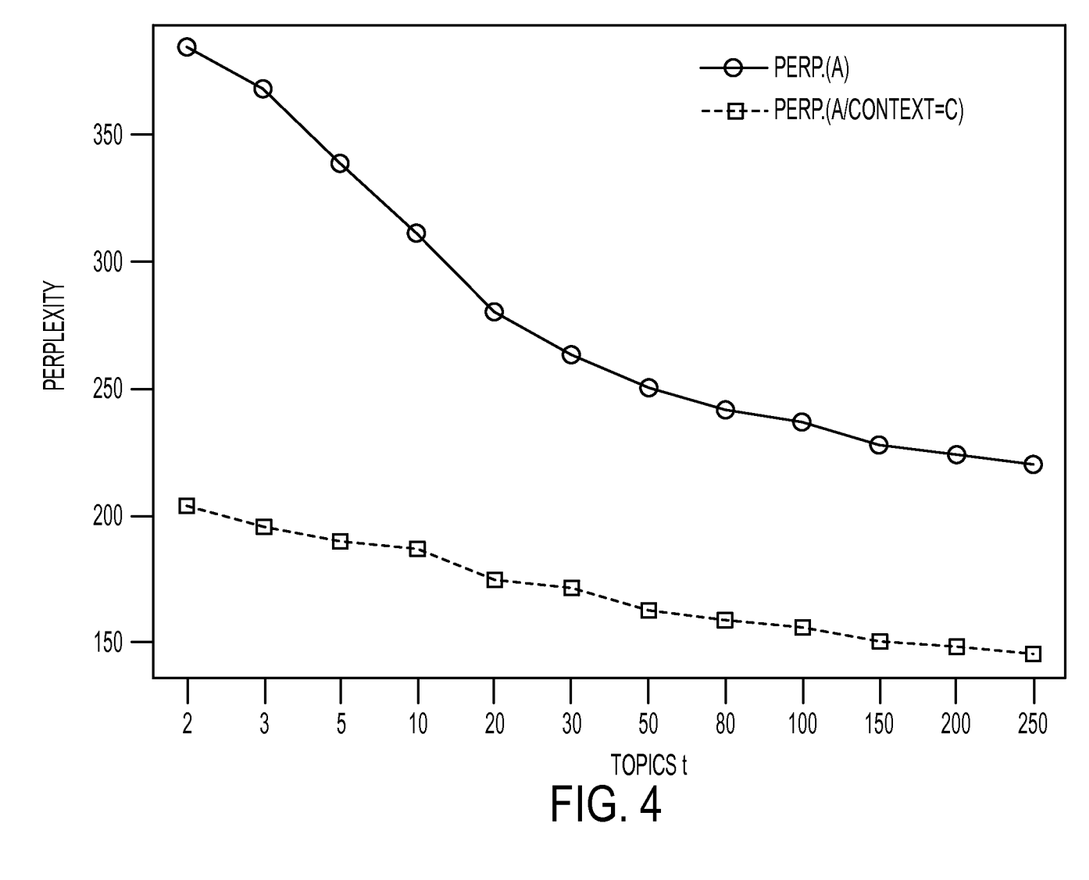
FIG. 4 is a plot which shows perplexity for different numbers of latent topics.

In FIG. 4, the perplexity scores (computed as described above), for the two models 64, 66 on the example collection are shown. It can be seen that the model 66 which uses the customer's email as context has lower perplexity scores than the model 64. This provides a rationale for using model 66 rather than model 64 in S110.

3. Predicting the Topic(s) in the Agent's Email/Next Sentence Given the Context of the Agent's Previous Sentences (in Addition to the Customer's Query)

For learning the LDA topic models 62, 66, 68, the MALLET toolkit, with the standard (default) setting is used. See, Andrew Kachites McCallum, "Mallet: A machine learning for language toolkit (2002), available at http://people.cs.umass.edu/~mccallum/mallet/ for a description of this algorithm.

The present method is evaluated using three metrics:

A. Bhattacharyya Coefficient (see, Anil Bhattacharyya, "On a measure of divergence between two statistical populations defined by their probability distributions," Bulletin of the Calcutta Mathematical Society, 35:99-109 (1943).)

Here, an evaluation is made as to how close the predicted topic distribution is to the "observed" (annotated) topic distribution (predicted by LDA, as described above for S102). For Task T1, the topic distribution $\hat{\tau}^M(A_i)$ is compared with $\tau_{C_A}^M(A_i)$ for each agent email $A_i$ of the test set. For Task T2, $\hat{\tau}_S^M(A_{i,j+1})$ is compared with $\tau_S^M(A_{i,j+1})$ for each sentence (j+1) of the agent emails $A_i$ of the test set.

B. Text Ranking Measure (for Task T1)

Instead of directly comparing the probability distributions, a measure of how useful the predicted probability distribution is in discriminating the correct agent's response in comparison to a set of k−1 randomly introduced responses from the training set. This amounts to recommending one standard response among a set of k possible answers. The k possible answers are ranked according to the Bhattacharyya coefficient between their LDA-predicted topic distribution and the one predicted from the customer's query email following Eqn. 2. The average Recall@1 measure, i.e., the average number of times where the correct response is ranked first is reported.

C. Dominant Topic Prediction Accuracy (for Task T2)

For this metric, a determination of whether the dominant topic of the LDA annotation of the next sentence is among the top-K topics predicted in Task 2. A high accuracy is desirable for ensuring effective topical suggestions for interactive response composition, which is the primary motivation of our work.

Topic Prediction of Agent's Entire Email

Figure 5:
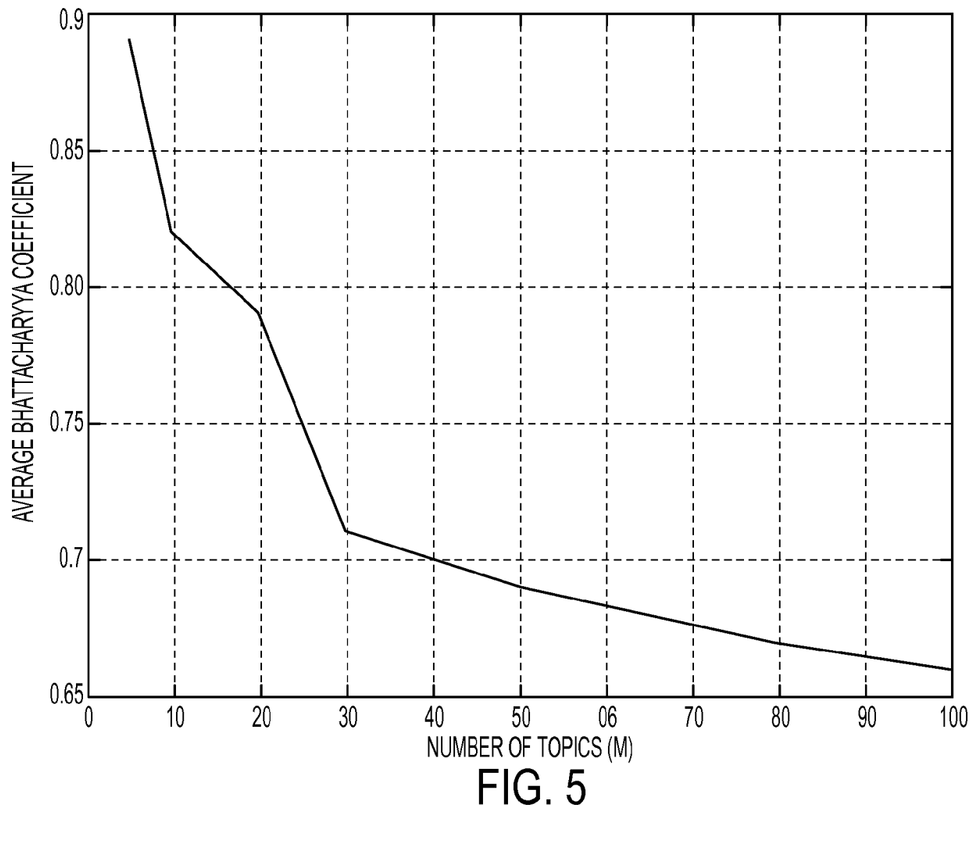
FIG. 5 is a plot which illustrates the average Bhattacharyya coefficient over all test emails for different numbers of latent topics.

FIG. 5 shows the average Bhattacharyya coefficient over all test emails for different numbers of topics (M) using the $\mathcal{M}_{C_A}^M$ model. This figure illustrates the trade-off between the difficulty of the task and the usefulness of the model: a higher number of topics corresponds to a more fine-grained analysis of the content, with potentially better predictive usefulness, but at the same time it is harder to reach a given level of performance (as measured by the Bhattacharyya coefficient) than with a few number of topics.

Figure 6:
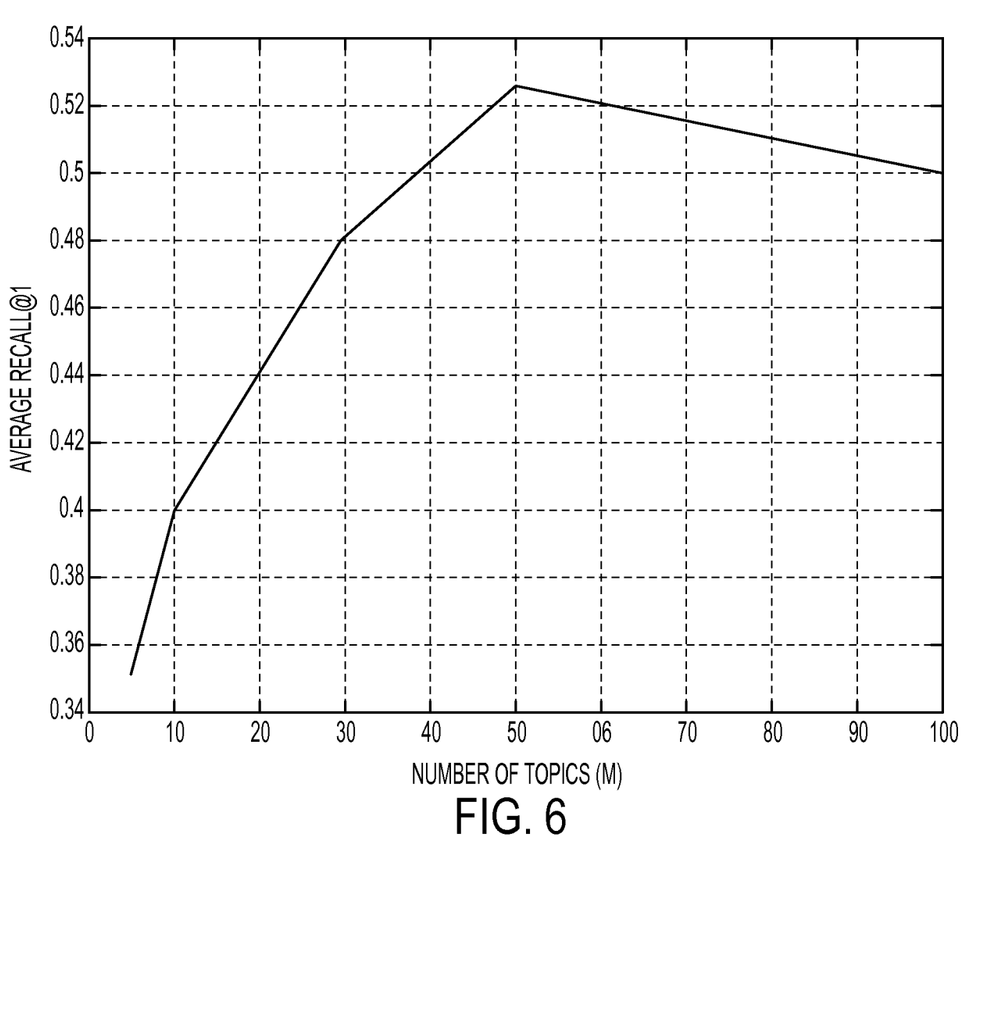
FIG. 6 is a plot which shows text identification accuracy over all test emails for different numbers of latent topics.

FIG. 6 shows the average Recall@1 measure for k=5 and different numbers of topics. In this case, the baseline (a simple random guess) would have given an average Recall@1 equal to 20%. The best performance (Recall@1=52.5%) is reached when M=50, suggesting that this may be a suitable number of topics.

Figure 7:
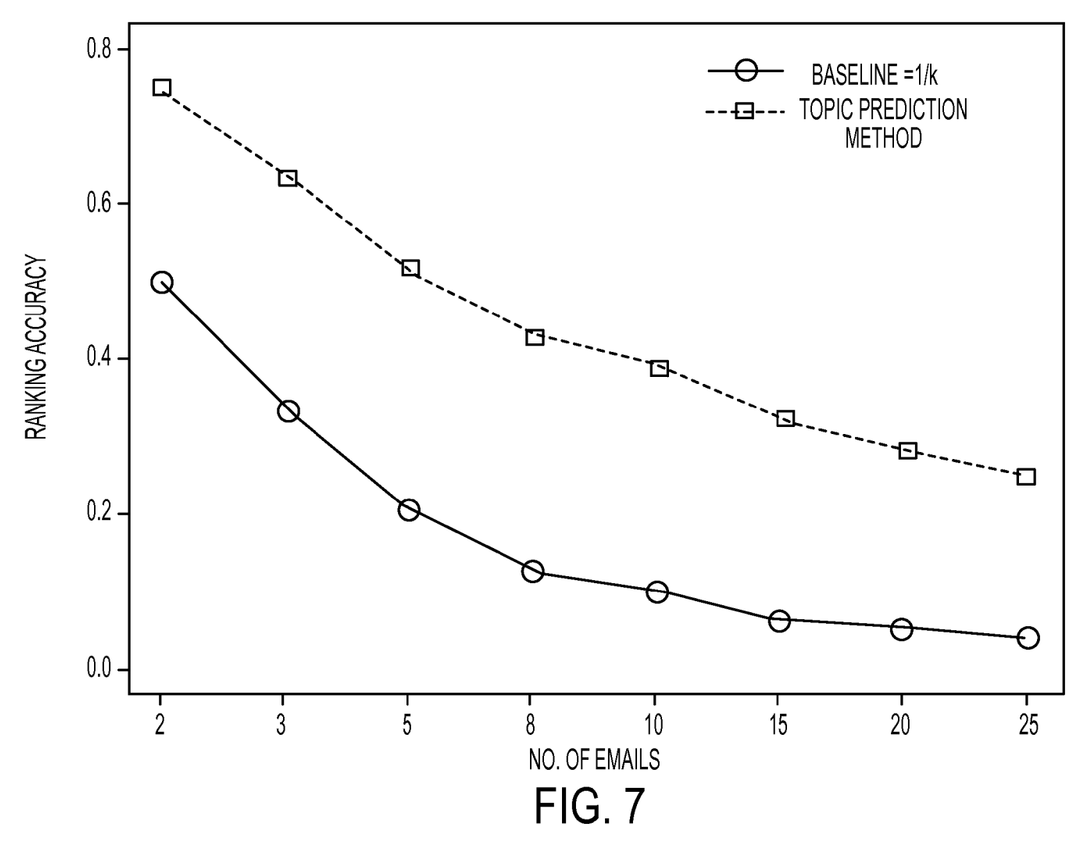
FIG. 7 is a plot which shows text identification accuracy with varying k.

The average Recall@1 score with varying k and M fixed to 50 is shown in FIG. 7. It can be seen that the text ranking based on the topic distribution prediction is always much higher than the baseline scores.

Topic Prediction of Agent's Next Sentence

The dominant topic prediction accuracy of the exemplary LDA-based Sentence prediction model is compared with two baseline approaches. The baseline approaches employed are:

1. Uniform: this approach assigns a uniform distribution of topics for every sentence in the test set and compares it with the LDA annotations. i.e., performs a completely random ranking of the topics 2. Default: this approach assigns the same topic distribution for every sentence of the test set; this topic distribution is the global average topic distribution and can be directly derived from the hyper-parameter α in LDA models by "normalizing" the values of the α vector (in the present case, this hyper-parameter is learned from the training data).

TABLE 4 gives the dominant topic prediction accuracy for the "next topic prediction" task, with K=1 (i.e., the relative number of times where the predicted dominant topic corresponds to the dominant topic given by the LDA annotation). These values are averaged values over all sentences of the test set, irrespective of their position. For this, the predictors given by Eqn. 4 are used, fixing the number of topics M to 50. The standard multi-class logistic regression outputs a probability distribution over the topics. This allows computing the Bhattacharyya coefficient between this predicted distribution and the LDA annotation distribution as well. This information is also given in TABLE 4. To see the relative impact of each type of input features, the table gives the performance for specific subsets of features: the ω(x) symbol represents the bag-of-word feature vector of text entity x, while τ(x) represents the topic distribution vector of text entity x.

TABLE 4

Next Sentence Topic Prediction Scores, DTA: top-1 Dominant Topic Accuracy, BC: Bhattacharyya Coefficient

| Features | Uniform | | Default | | LDA-based method | |
| --- | --- | --- | --- | --- | --- | --- |
|  | DTA | BC | DTA | BC | DTA | BC |
| ω($C_i$), ω($A_{i,j}$) + | 0.02 | 0.308 | 0.064 | 0.334 | 0.416 | 0.556 |
| position | 0.02 | 0.308 | 0.064 | 0.334 | 0.431 | 0.572 |
| τ($C_i$), τ($A_{i,j}$) + | 0.02 | 0.308 | 0.064 | 0.334 | 0.450 | 0.588 |
| ω($C_i$), ω($A_{i,j}$) + | 0.02 | 0.308 | 0.064 | 0.334 | 0.451 | 0.598 |
| position | 0.02 | 0.308 | 0.064 | 0.334 | 0.471 | 0.614 |

The topic prediction accuracy (by DTA) for the next sentence is 0.471 in the exemplary LDA-based prediction method. This indicates that about half of the predicted topics match the actual topic (based on the LDA annotations), which is a significant accuracy in the interactive composition scenario.

TABLE 5 shows the dominant topic prediction accuracies in the top-K predicted topics, with different values of K. It can be seen that, in an interactive composition scenario where the agent is presented with 5 recommended topics or standard sentences, the agent will be able to recognize the relevant topic in more than 80% of the cases.

TABLE 5

Next Sentence Dominant Topic Accuracy Scores w.r.t Top-K Predictions

| | Dominant Topic in top-K predictions | | | |
|---|---|---|---|---|
| Features | K = 1 | K = 2 | K = 5 | K = 10 |
| $\omega(C_i)$, $\omega(A_{i,j})$ + | 0.416 | 0.532 | 0.722 | 0.851 |
| position | 0.431 | 0.563 | 0.735 | 0.858 |
| $\tau(C_i)$, $\tau(A_{i,j})$ + | 0.450 | 0.623 | 0.795 | 0.893 |
| $\omega(C_i)$, $\omega(A_{i,j})$ + | 0.451 | 0.610 | 0.794 | 0.901 |
| position | 0.471 | 0.625 | 0.802 | 0.901 |

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for assisting an agent to respond to a customer inquiry comprising:
   receiving a customer inquiry;
   generating a first latent topic prediction for the customer inquiry based on a word-based representation of the customer inquiry;
   generating a second latent topic prediction for an entire agent's reply to the customer inquiry as a function of the latent topic prediction generated for the customer inquiry;
   generating a third latent topic prediction for a next sentence of the agent's reply as a function of a topic prediction for the next sentence generated with a prediction model trained on annotated sentences of agent replies; and
   outputting information to assist the agent, based on the second and third topic predictions,
   wherein at least one of the generating of the first, second and third latent topic predictions and the outputting of information is performed with a processor.

2. The method of claim 1, wherein the generating of the first latent topic prediction comprises using a first topic prediction model which has been learned on word-based representations of training samples and respective topic annotations.

3. The method of claim 2, wherein the training samples are each a concatenation of a customer's inquiry and a corresponding agent's reply.

4. The method of claim 2, wherein the topic annotations are synthetically generated from training samples.

5. The method of claim 2, wherein the topic annotations are generated by Latent Dirichlet Allocation.

6. The method of claim 2, further comprising learning the first topic prediction model on the word-based representations of training samples and the respective topic annotations.

7. The method of claim 1, wherein the generating of the second latent topic prediction includes computing a function of a representation of words of the customer's inquiry and the first topic prediction.

8. The method of claim 7, wherein the computing of the function of the representation of words of the customer's inquiry and the first latent topic prediction comprises computing:

$$\hat{\tau}^m(A_i) = f(\omega(C_i), \tau_{CA}{}^M(C_i)),$$

where $\omega(C_i)$ represents the representation of the customer inquiry $\tau_{CA}{}^M(C_i)$ represents the first latent topic prediction, and M is the number of latent topics.

9. The method of claim 8, where M is at least 10.

10. The method of claim 1, wherein the function for computing the second latent topic prediction is learned by structured output learning using gradient descent.

11. The method of claim 1, wherein the generating of the third latent topic prediction includes computing a function of a fourth latent topic prediction, the fourth latent topic prediction being based on a representation of words of a current sentence of the agent's reply.

12. The method of claim 11, wherein the function for the third latent topic prediction is also based on at least one of a representation of words of the customer's inquiry, the first latent topic prediction, and a representation of words of the agent's reply.

13. The method of claim 11, wherein the generating of the third latent topic prediction includes computing a function of the form:

$$\hat{\tau}_S{}^M(A_{i,j+1}) = f(\omega(C_i), \tau_{CA}{}^M(C_i), \omega(A_i), \tau_S{}^M(A_{i,j}), j)$$

where j is the sentence position (index) in the agent's reply, $\omega(C_i)$ is the representation of words of the customer's email, $\tau_{CA}{}^M(C_i)$ is the latent topic prediction for the customer's inquiry, $\omega(A_i)$ is the representation of words of at least one sentence of the agent's email, and $\tau_S{}^M(A_{i,j})$ is the fourth latent topic prediction, generated based on the current sentence of the agent's email.

14. The method of claim 11, wherein the generating of the third latent topic prediction includes computing a set of latent topic predictions, one for each of a set of values of a dominant latent topic identified in the fourth latent topic prediction.

15. The method of claim 14, wherein the generating of the third latent topic prediction includes computing, for each possible value of the dominant latent topic of the current sentence:

$$\hat{D}_S{}^M(A_{i,j+1}) = f(\omega(C_i), \tau_{CA}{}^M(C_i), \omega(A_i), D_S{}^M(A_{i,j}), j).$$

16. A computer program product comprising a non-transitory recording medium storing instructions, which when executed on a computer, cause the computer to perform a method for assisting an agent to respond to a customer inquiry comprising:
   receiving a customer inquiry;
   generating a first latent topic prediction for the customer inquiry based on a word-based representation of the customer inquiry;
   generating a second latent topic prediction for an entire agent's reply to the customer inquiry as a function of the latent topic prediction generated for the customer inquiry;
   generating a third latent topic prediction for a next sentence of the agent's reply as a function of a topic prediction for the next sentence generated with a prediction model trained on annotated sentences of agent replies; and
   outputting information to assist the agent, based on the second and third topic predictions.

17. A system comprising memory which stores instructions for performing the method of claim 1 and a processor in communication with the memory which executes the instructions.

18. An assistance system comprising:
memory which stores a set of latent topic prediction models;
a customer electronic mail message topic prediction component which generates a latent topic prediction for an input customer inquiry, in the form of a first electronic mail message, based on a word-based representation of the customer inquiry and a first of the latent prediction models which has been trained on at least one of annotated customer inquiries and annotated agent replies;
an agent electronic mail message topic prediction component which generates a latent topic prediction for an agent's reply to the customer inquiry, in the form of a second electronic mail message, as a function of the latent topic prediction generated for the customer inquiry;
a sentence topic prediction component which generates a latent topic prediction for a next sentence of the agent's reply based on at least one previous sentence of the agent's reply and a second of the prediction models which has been trained on annotated sentences of agent replies;
a suggestion component which outputs information to assist the agent, based on the latent topic prediction for the agent's reply and the latent topic prediction for a next sentence of the agent's reply; and
a processor in communication with the memory which implements the components.

19. The system of claim 18, further comprising a training component which learns the first and second prediction models on annotated electronic mail messages, the annotations comprising automatically-generated latent topic annotations.

20. A topic prediction method comprising:
learning a plurality of topic prediction models including a first topic prediction model and a second topic prediction model, the first topic prediction model being learned with at least one of annotated customer inquiries and annotated agent replies, the second topic prediction model being learned on annotated sentences of agent replies, the annotations having been generated with a generative topic model which predicts latent topics based on a word-based representation of text;
generating a first latent topic prediction for a customer's inquiry with the first topic prediction model;
generating a second latent topic prediction for an agent's reply to the customer inquiry as a function of the latent topic prediction generated for the customer inquiry;
generating a third latent topic prediction for a next sentence of the agent's reply as a function of a prior sentence of the agent's reply and the second prediction model;
wherein at least one of the generating of the first, second and third latent topic predictions is performed with a processor.

* * * * *